US011748395B2

(12) United States Patent
Jones (10) Patent No.: US 11,748,395 B2
(45) Date of Patent: Sep. 5, 2023

(54) DEVELOPING OBJECT ONTOLOGIES AND DATA USAGE MODELS USING MACHINE LEARNING

(71) Applicant: Science Applications International Corporation, Reston, VA (US)

(72) Inventor: Benjamin Colby Jones, Tuscumbia, AL (US)

(73) Assignee: Science Applications International Corporation, Reston, VA (US)

( * ) Notice: Subject to any disclaimer, the term of this patent is extended or adjusted under 35 U.S.C. 154(b) by 53 days.

(21) Appl. No.: 17/358,322

(22) Filed: Jun. 25, 2021

(65) Prior Publication Data

US 2022/0414136 A1 Dec. 29, 2022

(51) Int. Cl.
*G06F 16/00* (2019.01)
*G06F 16/36* (2019.01)
*G06N 20/00* (2019.01)
*G06F 40/30* (2020.01)
*G06F 16/242* (2019.01)

(52) U.S. Cl.
CPC ........ *G06F 16/367* (2019.01); *G06F 16/2445* (2019.01); *G06F 40/30* (2020.01); *G06N 20/00* (2019.01)

(58) Field of Classification Search
CPC ..... G06F 16/367; G06F 16/2445; G06F 40/30
See application file for complete search history.

(56) References Cited

U.S. PATENT DOCUMENTS

| | | | |
|---|---|---|---|
| 7,096,229 B2 | 8/2006 | Dettinger et al. | |
| 7,146,376 B2 | 12/2006 | Dettinger et al. | |
| 9,165,034 B2 | 10/2015 | Edwards et al. | |
| 9,477,572 B2 | 10/2016 | Suit | |
| 10,705,812 B2 | 7/2020 | Seetharaman et al. | |
| 2018/0067732 A1* | 3/2018 | Seetharaman | ........ G06F 3/0649 |

FOREIGN PATENT DOCUMENTS

KR 20060077829 A * 7/2006 ......... G06F 17/2705

OTHER PUBLICATIONS

Sep. 18, 2020, CodeBERT: A Pre-Trained Model for Programming and Natural Languages.
2004, Translation of Korean Application No. KR20060077829A, Entitled Method for Analysing Correlation of System Elements.

* cited by examiner

*Primary Examiner* — Cheryl Lewis
(74) *Attorney, Agent, or Firm* — Banner & Witcoff, Ltd.

(57) ABSTRACT

An enterprise ontology, an application data usage model, and/or cross-application data dependencies may be developed using artificial intelligence. Using pattern recognition and/or information extraction techniques, the artificial intelligence may analyze application source code to identify common DDL or SQL statements to formulate an ontology and/or a usage model for the application. A plurality of application ontologies and/or data usage models may be used to build a semantic hub. The semantic hub may be analyzed to identify data redundancies, data use frequency, potential data quality challenges, and/or data dependencies between applications to produce a data abstraction model that allows legacy applications to communicate with one or more data stores.

20 Claims, 7 Drawing Sheets

DEVELOPING OBJECT ONTOLOGIES AND DATA USAGE MODELS USING MACHINE LEARNING

BACKGROUND

Applications typically use diverse technology stacks comprising different development platforms, database management systems, and supporting infrastructure. Different technical stacks access and utilize data in different ways (e.g., hierarchical databases vs. relational databases). Moreover, multiple, disparate data stores may contain equivalent or correlated information, but use varied language or conflicting organizational philosophies, which can further hinder the task of aligning information across data stores. Accordingly, it is difficult, if not impossible, to develop a comprehensive understanding of application data dependencies and usage across an enterprise for the purposes of allowing the applications and the data stores to communicate and/or exchange information.

SUMMARY

The following presents a simplified summary of various features described herein.

This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

The techniques described herein may leverage artificial intelligence to generate an enterprise ontology, application data usage models, a semantic hub, and/or a data abstraction layer. Artificial intelligence may automatically parse and ingest application database data definition language (DDL) into a repository that catalogs database object metadata. Based on the database object metadata, the artificial intelligence may generate a bottom-up ontology of the enterprise's data objects. Next, the artificial intelligence may analyze the source code of one or more applications to identify database statements, such as insert, select, update, and/or delete statements. The identified database statements may be mapped to database object metadata in the DDL repository. The mapping of the identified database statements to the database object metadata may be used to create an application data usage model. A plurality of application data usage models may be used to generate a semantic hub (e.g., semantically linked enterprise data usage model) that shows the interrelationship between the applications and the data objects. The plurality of application data usage models may also be compared to identify data redundancy, data use frequency, potential data quality challenges, and data dependencies between applications. By analyzing the semantic hub and/or the data usage models, the artificial intelligence may generate a data abstraction layer model comprising one or more microservices that can be used to modernize data, consolidate data, and/or improve data quality and/or access to and/or use of data by one or more applications.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

In the following description, reference is made to the accompanying drawings, which form a part hereof, and in which are shown various examples of features of the disclosure and/or of how the disclosure may be practiced. It is to be understood that other features may be utilized and structural and functional modifications may be made without departing from the scope of the present disclosure. The disclosure may be practiced or carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, features discussed herein may relate to methods, devices, systems, and/or computer-readable media for using artificial intelligence (e.g., machine learning, natural language processing) to develop an enterprise ontology, an application data usage model, and/or cross-application data dependencies. The artificial intelligence techniques described herein may translate data structures, map data structures from one data model (e.g., schema) to another, and/or convert data structures into more consumable forms.

Methods, devices, systems, and/or computer-readable media described herein may leverage artificial intelligence pattern recognition and/or information extraction to automate the ingesting and parsing of application database data definition language (DDL) into a repository cataloging database object metadata to generate a bottom-up ontology of an enterprise network. The artificial intelligence may then analyze the application source code to identify database statements. Those database statements may be mapped to an ontology (e.g., a DDL repository) to create a data usage model for the application. As the number of ontologies and the data usage models associated with each of a plurality of applications grows, the artificial intelligence techniques described herein may compare the ontologies and/or data models to determine data redundancies, data use frequency, potential data quality challenges, and/or data dependencies between applications. The interrelationship between the data used by each of the applications may form an enterprise-wide data usage map. The enterprise-wide data usage map may be used to generate a data abstraction layer model that comprises one or more microservices. The microservices may be for specific data types or groups to facilitate application modernization, data consolidation, and/or data quality improvement.

The artificial intelligence techniques described herein may streamline and automate development of an enterprise ontology, legacy application data usage model, and cross-application data dependencies. The artificial intelligence techniques described herein may compare data and develop a predictive model. Using pattern recognition and/or information extraction techniques, the artificial intelligence may analyze DDL and/or source code files to identify common DDL and/or SQL elements. Based on the identified common DDL and/or SQL statements, the artificial intelligence described herein may formulate an ontology and/or a usage model for an application. After developing ontologies and/or usage models for a plurality of applications, the artificial intelligence may use the ontologies and/or usage models to build an enterprise ontology and/or a semantic hub. The artificial intelligence described herein may then analyze the enterprise ontology and/or data usage model to identify data redundancies, data use frequency, potential data quality challenges, and/or data dependencies between applications to produce a data abstraction model. The data abstraction model may be a universal translator for inter-application communication, as well as application to data store communications. The data abstraction model may also provide a holistic view of data usage across the enterprise for analytical purposes.

The techniques described herein may provide a clean model of objects and relationships by producing meta-data to support boundary crossings informing the models and/or clarifying dependencies. Moreover, the holistic view of data usage across applications may provide insight into understanding data sprawl and quality, while identifying data dependencies by and across applications. The techniques described herein facilitate application rationalization, consolidation, and modernization by providing a data abstraction model to assist in the decoupling of legacy applications from their data. Additionally, a full understanding of data usage may allow applications to be rebuilt that can leverage low code software development platforms. In these and other ways, techniques described herein may be used to improve operation and/or efficiency of computers and/or of systems of computers that may be used to execute multiple applications. For example, a data abstraction model generated using one or more of the techniques described herein may facilitate improved communication between applications, may reduce consumption of computational resources (e.g., based on eliminating or merging identified data redundancies), may reduce error by identifying data quality changes, etc.

Figure 1A:
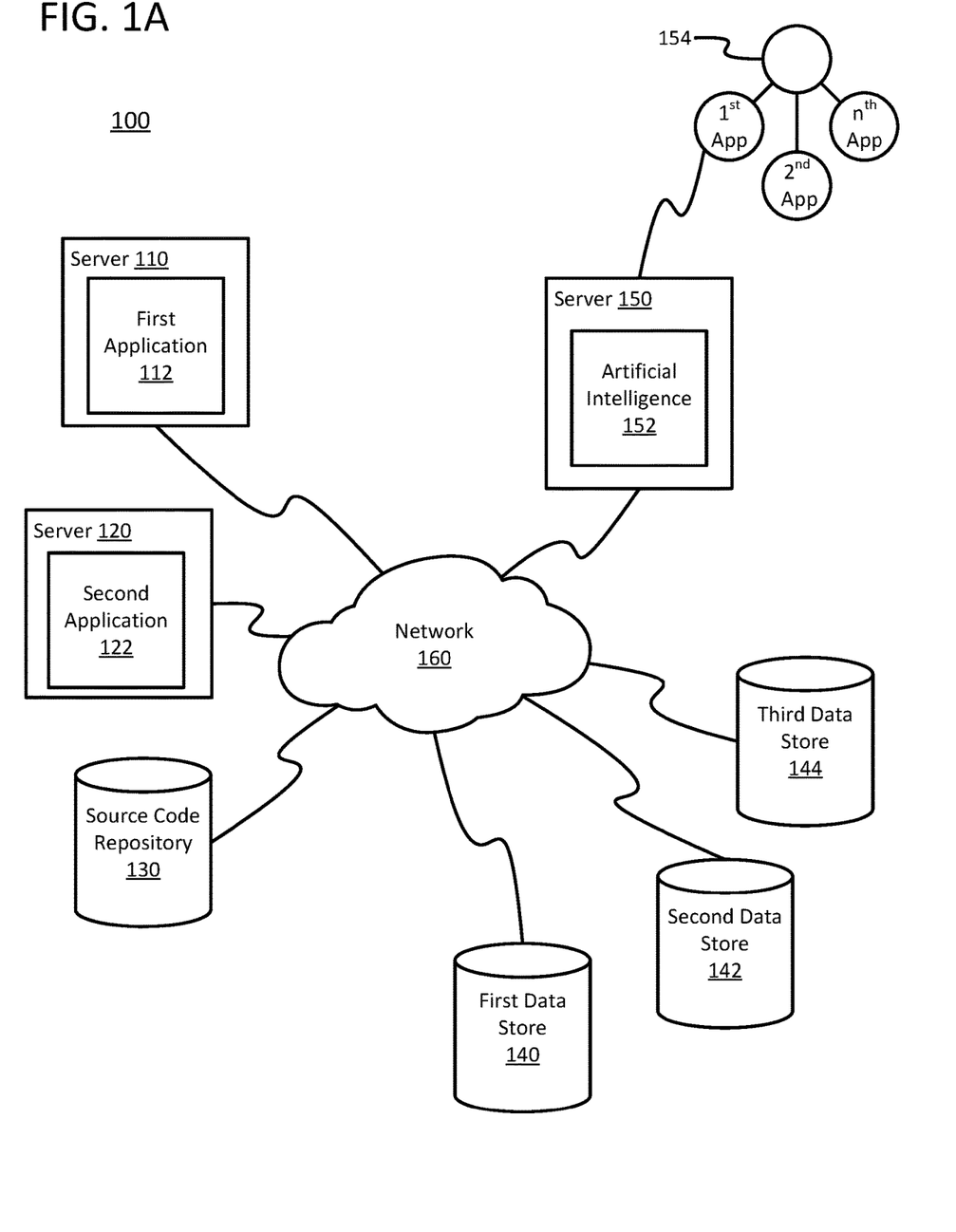
FIG. 1A shows an example of a system in which one or more features described herein may be implemented.

FIG. 1A shows an example of an enterprise system 100. The enterprise system 100 may comprise a first server 110, a second server 120, a source code repository 130, a first data store 140, a second data store 142, a third data store, 144, and a third server 150 interconnected via network 160.

The first server 110 may be any type of server, such as a stand-alone server, a corporate server, or a server located in a server farm or cloud-computer environment. According to some examples, the first server 110 may be a virtual server hosted on hardware capable of supporting a plurality of virtual servers. The first server 110 may comprise a first application 112. The first application 112 may be a forward facing (e.g., client facing) application. Alternatively, the first application 112 may be a backend application. The first application 112 may provide access to a plurality of tools and/or a variety of services. The plurality of tools and/or the variety of services performed by the first application 112 may access one or more data stores (e.g., first data store 140, second data store 142, third data store 144, etc.). For example, the first application 112 may obtain a first piece of information from the first data store 140, a second piece of information from the second data store 142, and so on, as part of performing the tools and services offered by the first application 112.

The second server 120 may be any of the servers discussed above with respect to the first server 110. The second server 150 may comprise a second application 122. The second application 122 may be similar to the first application 112.

The source code repository 130 may be any suitable source code repository. The source code repository 130 may be a separate stand-alone server, corporate server, server located in a server farm or cloud-computing environment, and/or virtual server hosted on hardware capable of supporting a plurality of virtual servers. The source code repository 130 may be configured as a digital distribution platform to provide a plurality of applications to a corporation and/or an enterprise. In some examples, the digital distribution platform may be hosted by a third party (e.g., external to the corporation and/or enterprise). The source code repository 130 may also be configured to host and distribute a plurality of configuration files, application libraries, and the like. In some examples, the source code repository 130 may be configured to store an application ontology, an application data usage map, an enterprise ontology, an enterprise data usage map, and/or an abstraction layer that allows applications (e.g., legacy applications) to communicate with the one or more data stores.

The first data store 140 may comprise one or more heterogeneous data stores. For example, the first data store 140 may comprise a database, such as a relational database, a hierarchical database, a distributed database, an in-memory database, a flat file database, an XML database, a NoSQL database, a graph database, and/or a combination thereof. The first data store 140 may be configured to store data and/or information, including, for example, data and/or information accessible by the first application 112 and/or the second application 122. The second data store 142 and/or the third data store 144 may be similar to the first data store 140. For example, the second data store 142 and/or the third data store 144 may comprise one or more relational databases, hierarchical databases, distributed databases, in-memory databases, flat file databases, XML databases, NoSQL databases, graph database, and/or any combination thereof.

The third server 150 may be any of the servers discussed above with respect to the first server 110. The second server 150 may comprise artificial intelligence 152. The artificial intelligence 152 may comprise one or more applications and/or other computational structures that implement one or more machine learning models and/or natural language processing. The artificial intelligence 152 may be configured to analyze the source code to identify common DDL and/or SQL elements. The analysis may be an automated analysis of the source code, such as natural language processing (NLP), object character recognition (OCR), computer vision, or any suitable document analysis algorithm. Based on the identified common DDL and/or SQL statements, the artificial intelligence 152 may generate an ontology and/or a data usage model for an application, such as the first application 112 and/or the second application 122. After developing ontologies and/or usage models for a plurality of applications, the artificial intelligence 152 may use the ontologies and/or usage models to build an enterprise ontology and/or a semantic hub 154. As will be discussed in greater detail below, the artificial intelligence 152 may then analyze the semantic hub 154 and/or data usage model to identify data redundancies, data use frequency, potential data quality challenges, and/or data dependencies between applications. Based on this analysis, the artificial intelligence 152 may generate a data abstraction model that allows applications (e.g., legacy applications) to communicate with the one or more data stores (e.g., the first data store 140, the second data store 142, the third data store 144). Additionally, the data abstraction model may provide a holistic view of data usage across the enterprise for analytical purposes.

The network 160 may include any type of network. The network 160 may include the Internet, a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. The data transferred to and from various computing devices in system 100 may include secure and sensitive data, such as confidential documents, customer personally identifiable information, and/or account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in system 100 in front of one or more computing devices such that any external devices may communicate directly with the specialized hardware.

Figure 1B:
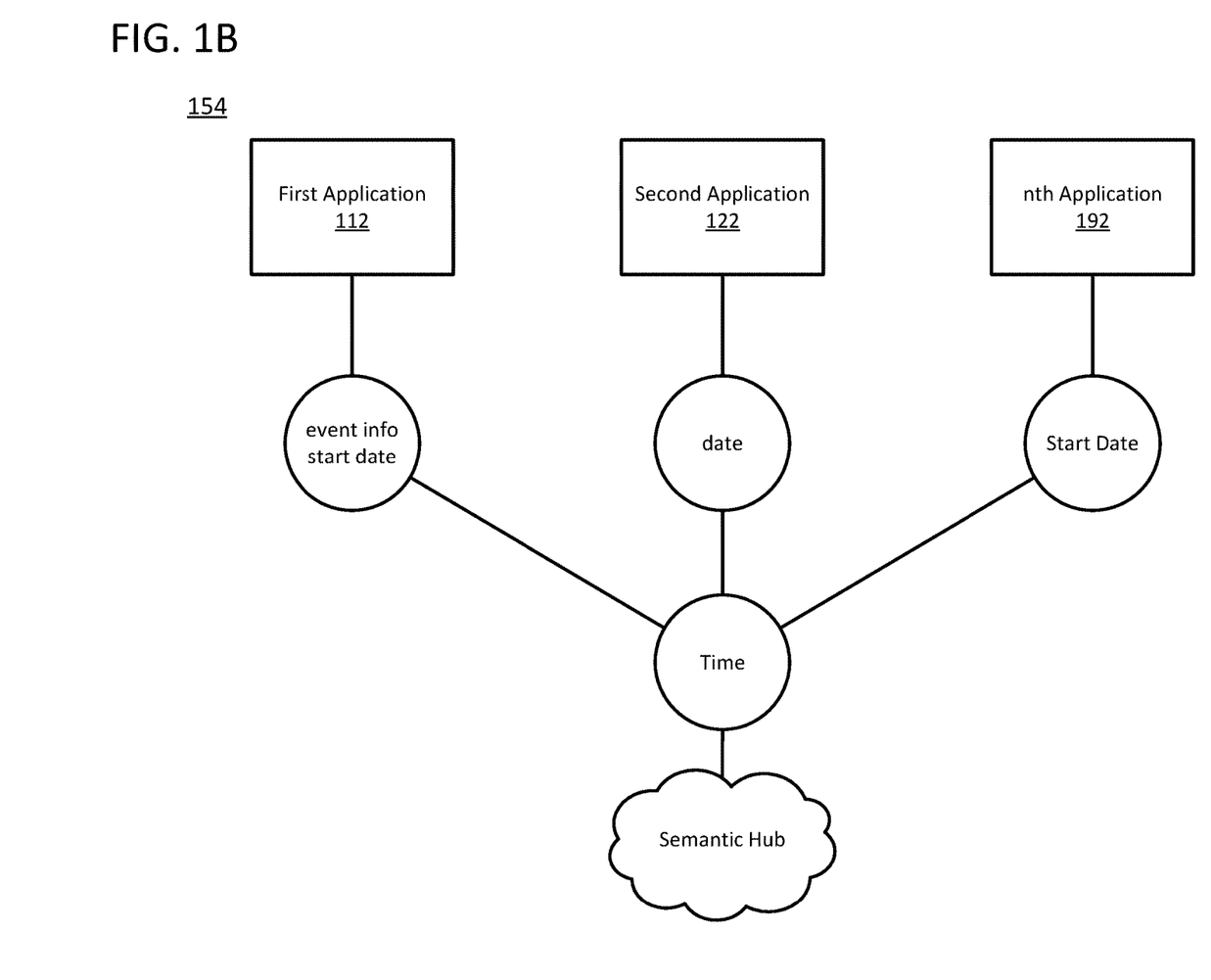
FIG. 1B shows an example of an enterprise ontology.

FIG. 1B shows an example of a semantic hub 154. The semantic hub 154 may be a defined model that represents the structured and unstructured data and/or information contained in an enterprise. In particular, the semantic hub 154 may be a semantic software dictionary which unites syntactical schemas. For example, the semantic hub 154 may comprise an ontological class "Time" which could be represented as "event info start date" for the first application 112, "date" for the second application 122, and "Start Date" for the nth application 192. In this regard, the semantic hub may be a dictionary, or reference source, that connects and associates time derivatives associated with each application to the "Time" ontological class. While FIG. 1B shows the ontological class "Time," it will be appreciated that the semantic hub 154 may comprise a plurality of ontological classes based on the objects, types, etc. associated with each of the plurality of applications being executed by an enterprise. In this regard, the semantic hub 154 may be used to unify and/or aggregate terminology across application data stores and provide insight into different terminology that has the same (or similar) meaning across a plurality of applications. As discussed herein, the artificial intelligence may identify derivatives of "Time" used in applications across the enterprise to provide a holistic representation of data redundancy and sprawl. Thus, the semantic hub 154 may represent an understanding of legacy application data dependencies and usage across the enterprise. As shown in FIG. 1B, the semantic hub may comprise a bottom-up ontology. It will be appreciated that a top-down ontology may be employed to represent the semantic hub 154. As will be discussed in greater detail below, the semantic hub 154 may be used to generate an enterprise data usage map, which can be used to generate a data abstraction layer model. The data abstraction layer model may comprise one or more micro services to facilitate application modernization, data consolidation, and/or data quality improvement.

Figure 2:
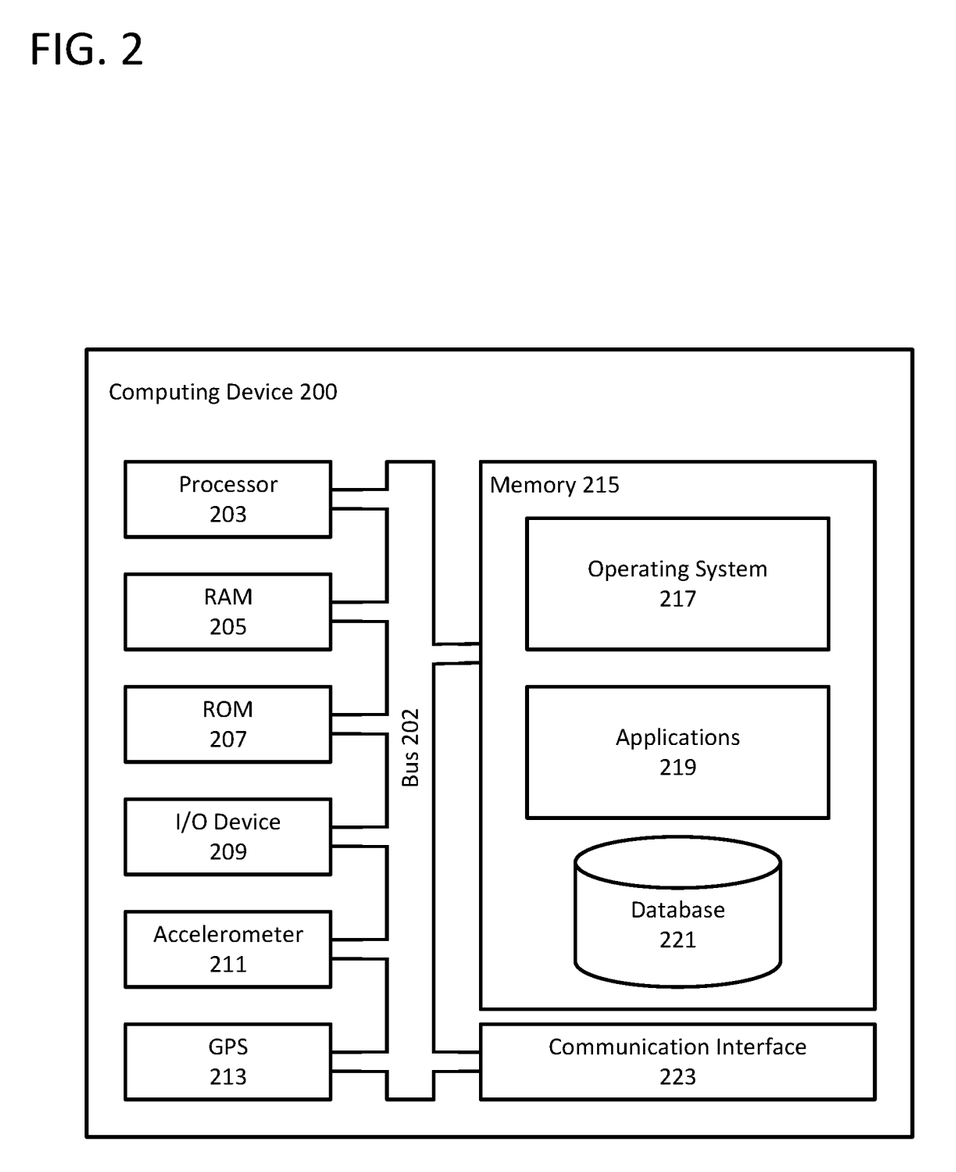
FIG. 2 shows an example computing device.

Any of the devices and systems described herein may be implemented, in whole or in part, using one or more computing devices, such as the computing device described with respect to FIG. 2. Turning now to FIG. 2, a computing device 200 that may be used with one or more of the computational systems is described. The computing device 200 may comprise a processor 203 for controlling overall operation of the computing device 200 and its associated components, including RAM 205, ROM 207, input/output device 209, accelerometer 211, global-position system antenna 213, memory 215, and/or communication interface 223. A bus 202 may interconnect processor(s) 203, RAM 205, ROM 207, memory 215, I/O device 209, accelerometer 211, global-position system receiver/antenna 213, memory 215, and/or communication interface 223. Computing device 200 may represent, be incorporated in, and/or comprise various devices such as a desktop computer, a computer server, a gateway, a mobile device, such as a laptop computer, a tablet computer, a smart phone, any other types of mobile computing devices, and the like, and/or any other type of data processing device.

Input/output (I/O) device 209 may comprise a microphone, keypad, touch screen, and/or stylus through which a user of the computing device 200 may provide input, and may also comprise one or more of a speaker for providing audio output and a video display device for providing textual, audiovisual, and/or graphical output. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may comprise volatile and nonvolatile, removable and non-removable media implemented in any method or technology for storage of information such as computer-readable instructions, data structures, program modules, or other data. Memory 215 may comprise one or more physical persistent memory devices and/or one or more non-persistent memory devices. Memory 215 may comprise random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Accelerometer 211 may be a sensor configured to measure accelerating forces of computing device 200. Accelerometer 211 may be an electromechanical device. Accelerometer may be used to measure the tilting motion and/or orientation computing device 200, movement of computing device 200, and/or vibrations of computing device 200. The acceleration forces may be transmitted to the processor to process the acceleration forces and determine the state of computing device 200.

GPS receiver/antenna 213 may be configured to receive one or more signals from one or more global positioning satellites to determine a geographic location of computing device 200. The geographic location provided by GPS receiver/antenna 213 may be used for navigation, tracking, and positioning applications.

Communication interface 223 may comprise one or more transceivers, modems, digital signal processors, and/or additional circuitry and software, protocol stack, and/or network stack for communicating via any network, wired or wireless, using any protocol as described herein.

Processor 203 may comprise a single central processing unit (CPU), which may be a single-core or multi-core processor, or may comprise multiple CPUs. Processor(s) 203 and associated components may allow the computing device 200 to execute a series of computer-readable instructions (e.g., instructions stored in RAM 205, ROM 207, memory 215, and/or other memory of computing device 215, and/or in other memory) to perform some or all of the processes described herein. Although not shown in FIG. 2, various elements within memory 215 or other components in computing device 200, may comprise one or more caches, for example, CPU caches used by the processor 203, page caches used by the operating system 217, disk caches of a hard drive, and/or database caches used to cache content from database 221. A CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For example, in a multi-tiered application, a database cache on an application server may reduce data retrieval and data manipulation time by not needing to communicate over a network with a back-end database server. These types of caches and others may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the disclosure. One or more of the components of the computing device 200 may be omitted, duplicated, or modified, and/or the computing device 200 may include additional components.

Figure 3:
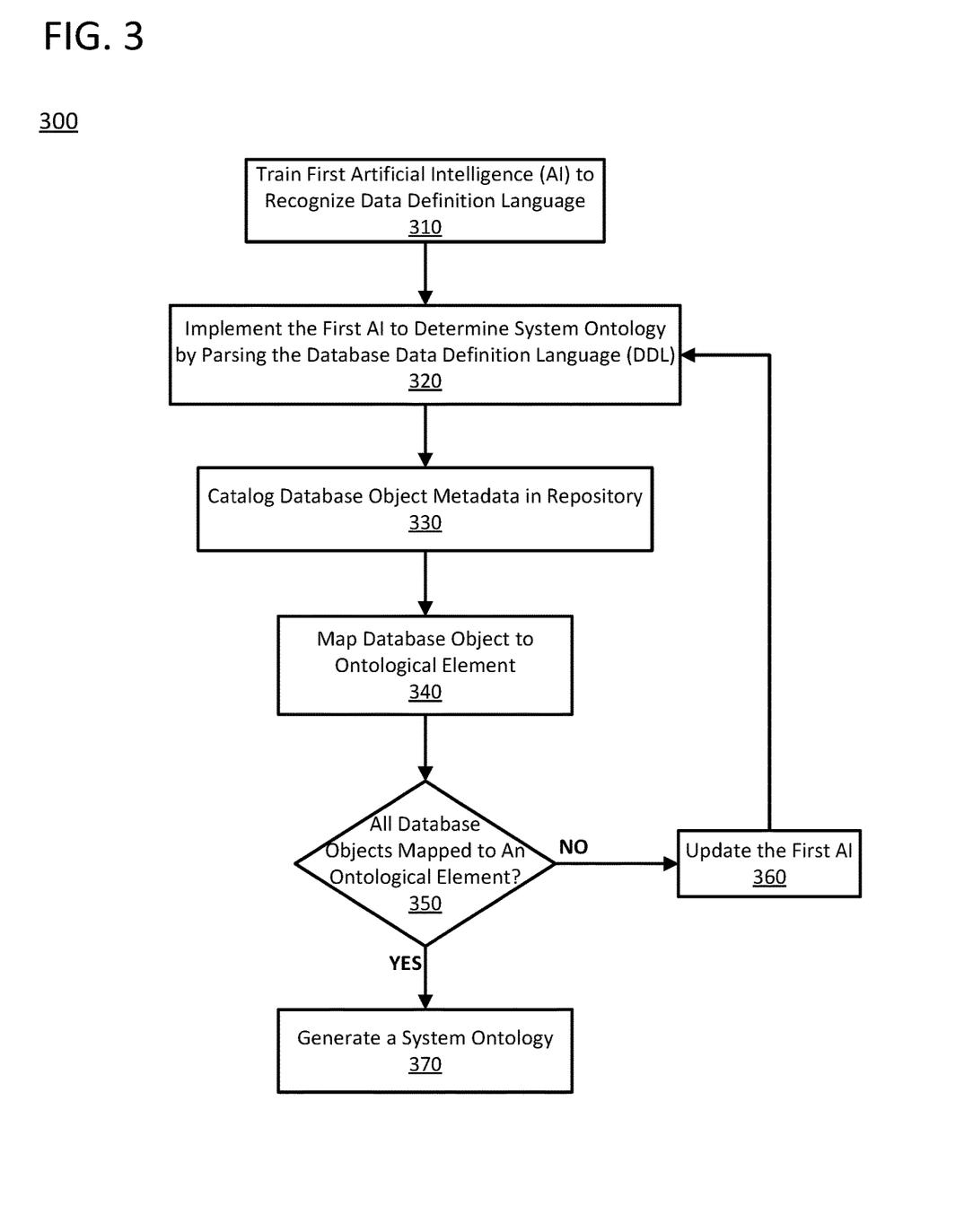
FIG. 3 shows a process for generating a system ontology.

To better understand the link between applications and the data that the applications access, a system ontology may be generated. FIG. 3 shows a flow chart of an example process 300 for generating a system ontology. Some or all of the steps of process 300 may be performed using one or more computing devices as described herein. For example, the steps of process 300 may be performed by the first server 110, the second server 120, the third server 150, and/or the computing device 200.

In step 310, a computing device may train a first artificial intelligence (AI) to recognize the data definition language (DDL) of one or more data stores associated with an enterprise. The first artificial intelligence may comprise one or more machine learning models, predictive analytics, predictive modelling, neural networks, decision trees, natural language processing algorithms, etc. The first artificial intelligence may be trained for programming language and natural language recognition. The first artificial intelligence may be trained using supervised learning, unsupervised learning, back propagation, transfer learning, stochastic gradient descent, learning rate decay, dropout, max pooling, batch normalization, long short-term memory, skip-gram, or any equivalent deep learning technique or a combination thereof. In some examples, the first artificial intelligence may be a pre-trained model, such as CodeBERT. Once the first artificial intelligence is trained, the first artificial intelligence may be exported and/or deployed, for example, in the third server 150 described above in FIG. 1A. The third server 150 may implement the first artificial intelligence to ingest, extract, and/or catalog database object metadata associated with one or more data stores.

In step 320, the first artificial intelligence may determine a system ontology. For example, the first artificial intelligence may ingest data and/or information contained in one or more data stores to identify common DDL elements. The DDL elements may include one or more of a database name, a schema name, an object name, and/or an object type. Object name and object type may include additional information, such as the table in which the object is stored, a primary key associated with the object, a foreign key associated with the object, a field associated with the object, a field side associated with the object, an index of the object, a stored procedure of the object, a trigger for the object, a view of the object, a link associated with the object, one or more packages associated with the object, one or more functions associated with the object, and/or one or more relationships associated with the object. Metadata associated with each of the database objects may be cataloged in a repository, for example, in step 330.

In step 340, the computing device may map a database object to an ontological element. That is, database schema may be semantically mapped to an ontological element in a system ontology. The mapping may be performed using a weighting approach. That is, one or more database commands (e.g., terms, phrases, etc.) may be mapped to a generic semantic definition. For example, the database commands: "event info start date," "eventInfo_startDate," "date," "start date," and "info start date" may be mapped to the semantic type "time."

In step 350, the computing device may determine if all of the database objects have been mapped to an ontological element. A database object may not map to an ontological element, for example, if the field cannot be semantically mapped into the system ontology. The computing device may analyze metadata (e.g., data type, field size, etc.) associated with the database object within a context of known ontological attributes. Based on the analysis, the computing device may predict a type for the database object. In some examples, the prediction may be provided to an administrator to evaluate the prediction. If the computing device's prediction is accurate, the administrator may confirm the prediction and update the first artificial intelligence accordingly, in step 360. If the computing device's prediction is inaccurate, the administrator may define a type for the database object and update the first artificial intelligence in step 360. The process 300 may then return to step 320 to continue the analysis of the DDL elements.

In step 370, the computing device may generate a system ontology based on mapping data objects to ontological elements. The system ontology may encompass all of the applications used in an enterprise. That is the system ontology may comprise a plurality of data objects stored by the enterprise. The data objects may represent a piece of information accessed by one or more applications currently in-use by the enterprise. By creating a system ontology, the computing device may have a better understanding of who owns and/or access the data and/or information stored by the enterprise, what the data and/or information stored by the enterprise is, where the data and/or information resides, and how often the data and/or information is accessed.

Figure 4:
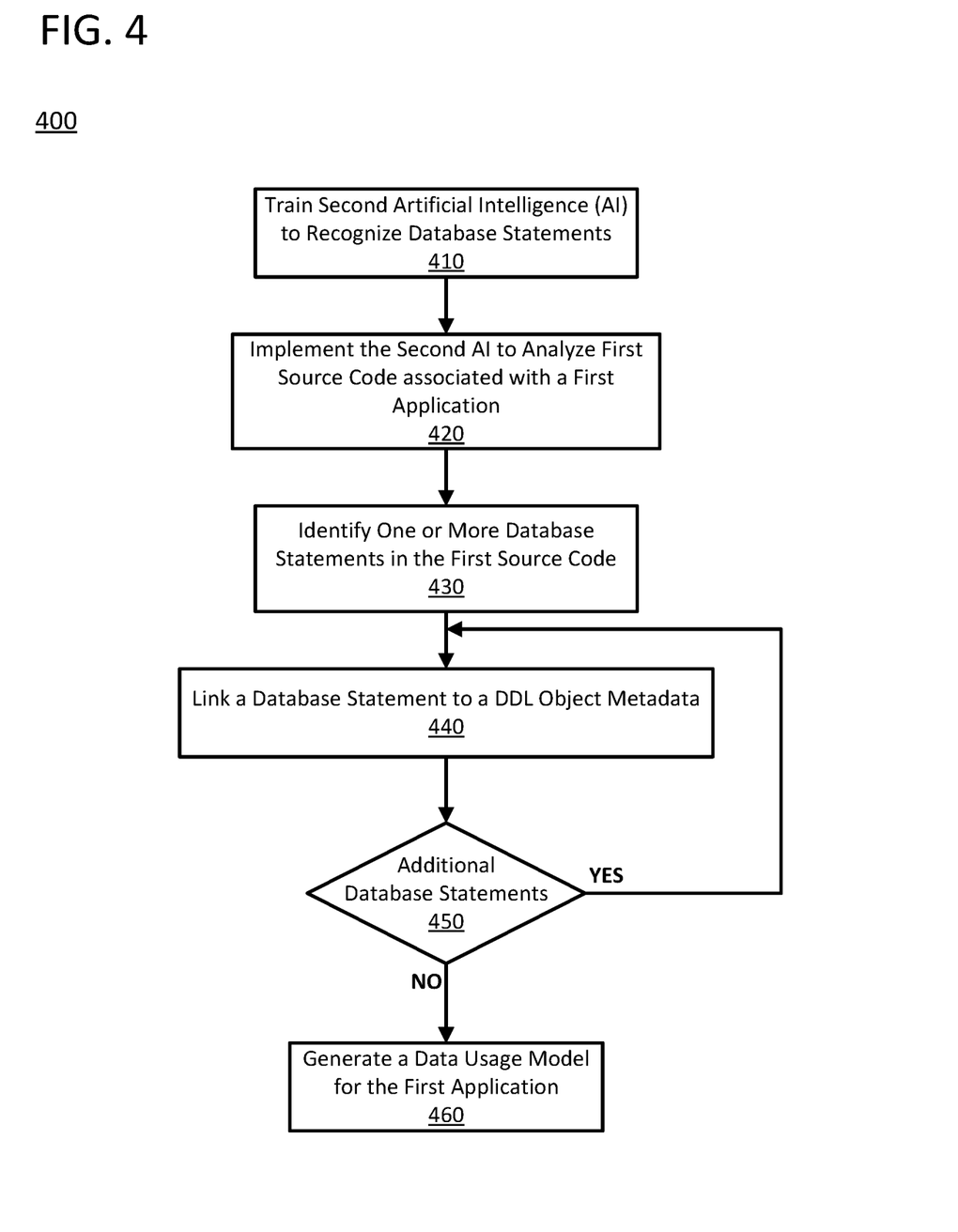
FIG. 4 shows a process for generating an application data usage model.

After creating the system ontology, data usage models may be generated to better visualize which applications access which data objects. FIG. 4 shows a flow chart of an example process 400 for generating an application data usage model. Some or all of the steps of process 400 may be performed using one or more computing devices as described herein. For example, the steps of process 400 may be performed by the first server 110, the second server 120, the third server 150, and/or the computing device 200.

In step 410, a computing device may train a second artificial intelligence to recognize one or more database statements. Like the first artificial intelligence above, the second artificial intelligence may comprise one or more machine learning models, predictive analytics, predictive modelling, neural networks, decision trees, natural language processing algorithms, etc. trained for programming language and/or natural language recognition. The second artificial intelligence may use any of the training techniques described above, individually or in combination. The second artificial intelligence may be a pre-trained model, such as CodeBERT. Once the second artificial intelligence is trained, the second artificial intelligence may be exported and/or deployed, for example, in the third server 150. The third server 150 may implement the second artificial intelligence to generate one or more application data usage models. In some examples, the one or more applications may comprise a legacy application.

To generate a data usage model for a first application, the computing device, in step 420, may implement the second artificial intelligence to analyze first source code associated with the first application. In this regard, the second artificial intelligence may access one or more code repositories and/or servers to obtain a text file that contains the source code of the first application. The second artificial intelligence may ingest an application name and/or application configuration data, such as the database connect strings. In step 430, the second artificial intelligence may analyze the source code to identify one or more database statements. The statements may be analyzed to identify a location of a source file, an application programming interface (API) call, a user interface screen name, one or more fields accessed by the statements and the access type. The access type may be at least one of an insert, a select statement, an update statement, or a delete statement. In some examples, the second artificial intelligence may determine a frequency of the API call and/or user interface screen.

In step 440, the second artificial intelligence may link an identified database statement to DDL object metadata. The DDL object metadata may comprise database code, including the packages and/or stored procedures associated with the database code. In step 450, the computing device may determine whether there are any additional database statements to be mapped to DDL object metadata. If so, the process 400 returns to step 440. The process may continue until each of the identified database statements have been mapped to DDL object metadata. Once the database statements have been mapped to DDL object metadata, the computing device may generate a data usage model for the first application, in step 460.

Figure 5:
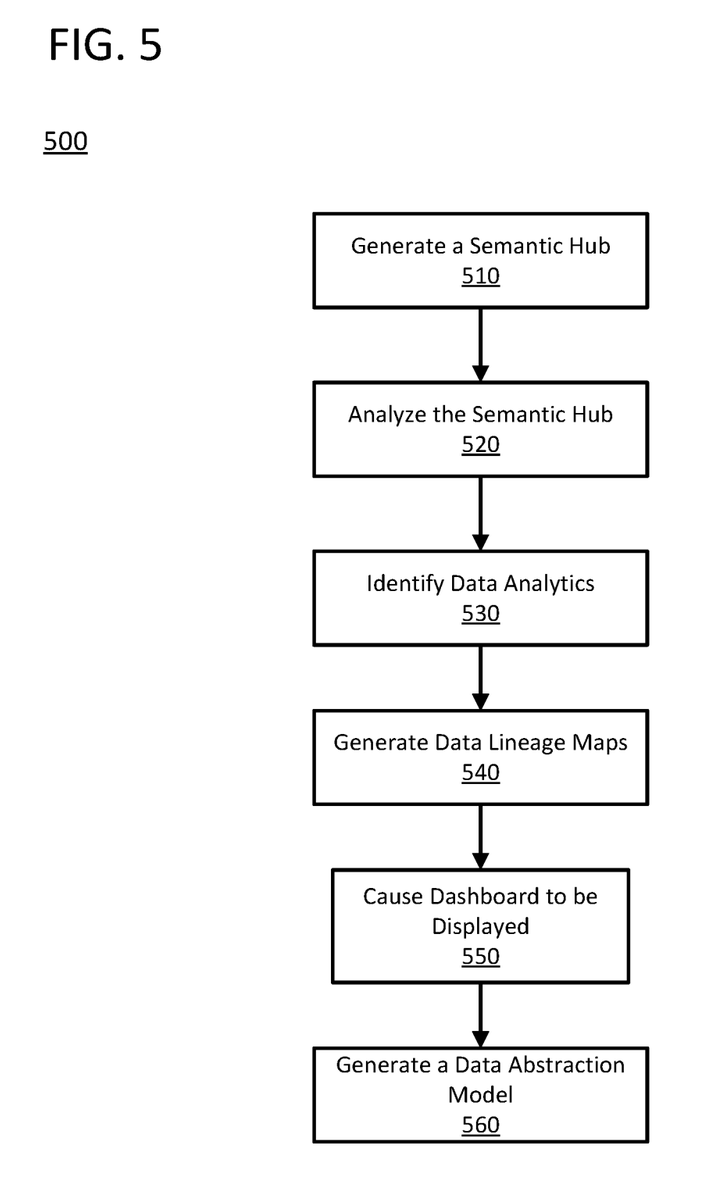
FIG. 5 shows a process for generating a data abstraction model.

After generating data usage models for a plurality of applications (e.g., by performing a plurality of iterations of the example process 400), a semantic hub may be generated, showing the interrelationship between the plurality of applications and a plurality of data stores. The semantic hub may be used to generate visualizations of the data mappings between applications and data stores. Additionally or alternatively, the semantic hub may be used to generate a data abstraction model. FIG. 5 shows a flow chart of an example process 500 for generating a data abstraction model. Some or all of the steps of process 500 may be performed using one or more computing devices as described herein. For example, the steps of process 500 may be performed by the first server 110, the second server 120, the third server 150, and/or the computing device 200.

In step 510, a computing device may generate a semantic hub. The semantic hub may be similar to semantic hub 154 discussed above with respect to FIG. 1B. To generate the semantic hub, the computing device may use a plurality of application data usage models to generate the semantic hub. That is, as applications and/or application data usage models are added to the system ontology (e.g., as part of one or more iterations of the example process 300), the semantic hub may form. The semantic hub may be used to link application data usage models to one or more ontological elements across applications. In step 520, the semantic hub may be analyzed. The semantic hub may be analyzed using one or more of the artificial intelligence techniques described above. Based on the analysis, the computing device may identify one or more data analytics in step 530. The data analytics may identify at least one data redundancy, data use frequency, data quality challenges, or a data dependency between the application and at least one second application. In this regard, the computing device may compare a first application data usage model (e.g., determined as part of an iteration of the example process 400) with the at least one second application data usage model (e.g., determined as part of another iteration of the example process 400) to identify the at least one data redundancy, data use frequency, data quality challenges, or a data dependency. The data analytics may also comprise an identification of applications accessing common data store elements. The applications and/or common data store elements may be identified. In some examples, the applications and/or common data store elements may be displayed and highlighted to denote data dependencies. The data analytics may also comprise an identification of applications accessing common ontological elements. Like the common data store elements, the applications and/or common ontological elements may be visualized and highlighted to denote data redundancies. The data analytics may also identify physical inefficiencies in a structure of a data store structure. These inefficiencies may negatively impact data quality. In another example, the data analytics may identify frequently used data.

In addition to the data analytics, the analysis of the semantic hub may cause one or more data lineage maps to be generated in step 540. The data lineage maps may comprise the origin of the data, a destination of the data, and/or the transformations that occur to the data between the origin and the destination. In step 550, the computing device may cause a dashboard to be displayed. The dashboard may comprise a graphical user interface that presents the data analytics and/or the data lineage maps. In step 560, the computing device may generate a data abstraction layer. The data abstraction layer may be generated based on at least one of the semantic hub, the data analytics, and/or the data lineage mappings. The data abstraction model may comprise one or more microservices that facilitate at least one of application modernization, data consolidation, and/or data quality improvement. The data abstraction layer may be an application programming interface (API) that unifies communications between one or more applications and/or one or more data stores (e.g., SQL server, DB2, MySQL, PostgreSQL, Oracle, SQLite, etc.). For example, the data abstraction model may receive a request from one or more applications and transform the response into a suitable format for a data store that stores the information associated with the request. Similarly, the data abstraction model may transform the request response from the data store into a format suitable for the one or more applications requesting the data.

Figure 6:
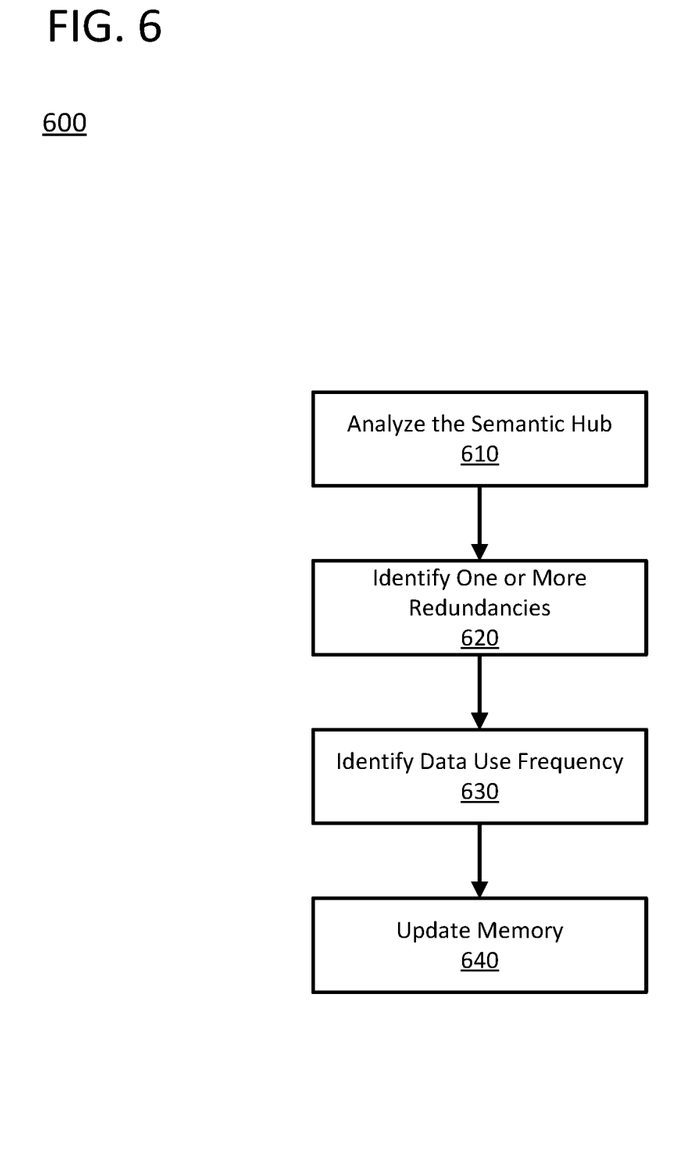
FIG. 6 shows a process for removing data redundancies.

As noted above, the analysis described above may facilitate data consolidation and/or improve data quality. FIG. 6 shows a flow chart of an example process 600 for removing redundancies. Some or all of the steps of process 600 may be performed using one or more computing devices as described herein. For example, the steps of process 600 may be performed by the first server 110, the second server 120, the third server 150, and/or the computing device 200.

In step 610, the semantic hub may be analyzed. The semantic hub may be analyzed using one or more of the artificial intelligence techniques described above. Based on the analysis, the computing device may identify one or more data redundancies, data use frequency, data quality challenges, or a data dependency between the application and at least one second application. In this regard, the computing device may compare a first application data usage model (e.g., determined as part of an iteration of the example process 400) with the at least one second application data usage model (e.g., determined as part of another iteration of the example process 400). In step 620, the artificial intelligence may identify one or more data redundancies. The one or more redundancies may be one or more applications accessing ontological elements (e.g., common data store elements). This may impact the performance of the one or more applications and/or the data quality if, for example, a first application of the one or more applications changes the commonly accessed data and/or information. Additionally or alternatively, the identification of one or more redundancies may identify the same information being stored in multiple data stores.

In step 630, the artificial intelligence may also identify data use frequency for each of the ontological elements stored in the semantic hub. For example, the artificial intelligence may identify at least one of a most frequently accessed data store element, a least frequently accessed data store element, a time of last access for each data store element, etc. Based on this analysis, the artificial intelligence may generate a most frequently accessed data list, a least frequently accessed data list, etc.

In step 640, the artificial intelligence may update the memory. In some embodiments, the artificial intelligence may provide a recommendation to a system administrator to update the memory. Alternatively, the artificial intelligence may comprise memory management software configured to update the memory. Updating the memory may comprise one or more of merging data stores so that the commonly accessed information is stored in a single location. Additionally or alternatively, the one or more applications accessing the common information may be updated to request the information from the single location. In another alternative, the data abstraction model may be updated to receive requests from the one or more applications and obtain the information from the single location. Updating the memory may also comprise moving the most frequently accessed data to a faster data store (e.g., cache). Similarly, updating the memory may comprise deleting or removing the least frequently accessed data. Alternatively, the least frequently accessed data may be moved to a slower and/or less frequently accessed data store.

The question of whether to delete/remove or move the least frequently accessed data may also be based on the time the data was last accessed. For example, if an application accesses data once a month, that data may be moved to a slower, less frequently used data store. However, if data has not been accessed for a predetermined amount of time (e.g., >1 year), the data may be deleted/removed from the memory. This improves the hygiene and data management of the enterprise by removing data that has not been accessed. Moreover, updating the memory may improve the overall functionality of the enterprise by reducing the time to retrieve information from the one or more data stores.

The above-described systems, devices, and methods may generate a semantic hub model of objects and relationships by producing meta-data to support boundary crossings to inform data usage models and/or clarifying dependencies. Moreover, the holistic view of data usage across applications may provide insight into understanding data sprawl and quality, while identifying data dependencies by and across applications. The techniques described herein facilitate application rationalization, consolidation, and modernization by providing a data abstraction model to assist in the decoupling of legacy applications from their data. Additionally, a full understanding of data usage may allow applications to be rebuilt that can leverage low code software development platforms.

One or more features discussed herein may be embodied in computer-usable or readable data and/or computer-executable instructions, such as in one or more program modules, executed by one or more computers or other devices as described herein. Program modules may comprise routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) Java or Python. The computer executable instructions may be stored on a computer readable medium such as a hard disk, optical disk, removable storage media, solid-state memory, RAM, and the like. The functionality of the program modules may be combined or distributed as desired. In addition, the functionality may be embodied in whole or in part in firmware or hardware equivalents such as integrated circuits, field programmable gate arrays (FPGA), and the like. Particular data structures may be used to more effectively implement one or more features discussed herein, and such data structures are contemplated within the scope of computer executable instructions and computer-usable data described herein. Various features described herein may be embodied as a method, a computing device, a system, and/or a computer program product.

Although the present disclosure has been described in terms of various examples, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present disclosure may be practiced otherwise than specifically described without departing from the scope and spirit of the present disclosure. Although examples are described above, features and/or steps of those examples may be combined, divided, omitted, rearranged, revised, and/or augmented in any desired manner. Thus, the present disclosure should be considered in all respects as illustrative and not restrictive. Accordingly, the scope of the disclosure should be determined not by the examples, but by the appended claims and their equivalents.

What is claimed is:

1. A method comprising:
   ingesting, by a computing device, data accessed by a first application from one or more data stores;
   generating, based on the ingested data, a data definition language repository that catalogs database object metadata associated with the data accessed by the first application;
   accessing one or more code repositories to obtain source code of the first application;
   analyzing, using natural language processing, the source code of the first application to identify one or more data statements that access the one or more data stores;
   identifying, using a machine learning model, a link between the one or more data statements and the database object metadata;
   generating, based on the link between the one or more data statements and the database object metadata, a first application data usage model illustrating a relationship between the first application and the one or more data stores;
   generating, based on the first application data usage model and based on at least one second application data usage model, a semantic hub; and
   generating, based on the semantic hub, a data abstraction model configured to transform data exchanges between a second application and at least one data store of the one or more data stores.

2. The method of claim 1, further comprising:
   causing the semantic hub to be displayed via a dashboard.

3. The method of claim 1, further comprising:
   identifying, for the first application data usage model and the at least one second application data usage model, and by using a second machine learning model to analyze the semantic hub, at least one of a data redundancy, a data use frequency, a data quality challenge, or a data dependency.

4. The method of claim 3, wherein identifying at least one of a data redundancy, a data use frequency, a data quality challenge, or a data dependency comprises comparing the first application data usage model with the at least one second application data usage model.

5. The method of claim 1, wherein the data abstraction model further comprises one or more microservices that facilitate at least one of application modernization, data consolidation, or data quality improvement.

6. The method of claim 1, wherein the one or more data statements comprise at least one of:
   an insert statement;
   a select statement;
   an update statement; or
   a delete statement.

7. The method of claim 1, further comprising:
   causing, based on an analysis of the semantic hub, one or more data lineage maps to be displayed on a user device.

8. A computing device comprising
   one or more processors; and
   memory storing instructions that, when executed by the one or more processors, cause the computing device to:
      ingest data accessed by a first application from one or more data stores;
      generate, based on the ingested data, a data definition language repository that catalogs database object metadata associated with the data accessed by the first application;
      access one or more code repositories to obtain source code of the first application;
      analyze, using natural language processing, the source code of the first application to identify one or more data statements that access the one or more data stores;
      identify, using a machine learning model, a link between the one or more data statements and the database object metadata;
      generate, based on the link between the one or more data statements and the database object metadata, a first application data usage model illustrating a relationship between the first application and the one or more data stores;
      generate, based on the first application data usage model and based on at least one second application data usage model, a semantic hub; and
      generate, based on the semantic hub, a data abstraction model configured to transform data exchanges between a second application and at least one data store of the one or more data stores.

9. The computing device of claim 8, wherein the instructions, when executed by the one or more processors, cause the computing device to cause the semantic hub to be displayed via a dashboard.

10. The computing device of claim 8, wherein the instructions, when executed by the one or more processors, cause the computing device to identify, for the first application data usage model and the at least one second application data usage model, and by using a second machine learning model to analyze the semantic hub, at least one of a data redundancy, a data use frequency, a data quality challenge, or a data dependency.

11. The computing device of claim 10, wherein the instructions, when executed by the one or more processors, cause the computing device to identify the at least one of a data redundancy, a data use frequency, a data quality challenge, or a data dependency by comparing the first application data usage model with the at least one second application data usage model.

12. The computing device of claim 8, wherein the data abstraction model further comprises one or more microservices that facilitate at least one of application modernization, data consolidation, or data quality improvement.

13. The computing device of claim 8, wherein the one or more data statements comprise at least one of:
   an insert statement;

a select statement;
an update statement; or
a delete statement.

14. The computing device of claim 8, wherein the instructions, when executed by the one or more processors, cause the computing device to cause, based on an analysis of the semantic hub, one or more redundancies between the first application and the second application to be displayed on a user device.

15. A non-transitory computer-readable medium comprising instructions that, when executed, cause a computing device to:
- ingest data accessed by a first application from one or more data stores;
- generate, based on the ingested data, a data definition language repository that catalogs database object metadata associated with the data accessed by the first application;
- access one or more code repositories to obtain source code of the first application;
- analyze, using natural language processing, the source code of the first application to identify one or more data statements that access the one or more data stores;
- identify, using a machine learning model, a link between the one or more data statements and the database object metadata;
- generate, based on the link between the one or more data statements and the database object metadata, a first application data usage model illustrating a relationship between the first application and the one or more data stores;
- generate, based on the first application data usage model and based on at least one second application data usage model, a semantic hub; and
- generate, based on the semantic hub, a data abstraction model configured to transform data exchanges between a second application and at least one data store of the one or more data stores.

16. The non-transitory computer-readable medium of claim 15, wherein the instructions, when executed, cause the computing device to cause the semantic hub to be displayed via a dashboard.

17. The non-transitory computer-readable medium of claim 15, wherein the instructions, when executed, cause the computing device to identify, for the first application data usage model and the at least one second application data usage model, and by using a second machine learning model to analyze the semantic hub, at least one of a data redundancy, a data use frequency, a data quality challenge, or a data dependency.

18. The non-transitory computer-readable medium of claim 17, wherein the instructions, when executed, cause the computing device to identify the at least one of a data redundancy, a data use frequency, a data quality challenge, or a data dependency by comparing the first application data usage model with the at least one second application data usage model.

19. The non-transitory computer-readable medium of claim 15, wherein the data abstraction model further comprises one or more microservices that facilitate at least one of application modernization, data consolidation, or data quality improvement.

20. The non-transitory computer-readable medium of claim 15, wherein the one or more data statements comprise at least one of:
an insert statement;
a select statement;
an update statement; or
a delete statement.

* * * * *

UNITED STATES PATENT AND TRADEMARK OFFICE
CERTIFICATE OF CORRECTION

| | | |
|---|---|---|
| PATENT NO. | : 11,748,395 B2 | Page 1 of 1 |
| APPLICATION NO. | : 17/358322 | |
| DATED | : September 5, 2023 | |
| INVENTOR(S) | : Benjamin Colby Jones | |

It is certified that error appears in the above-identified patent and that said Letters Patent is hereby corrected as shown below:

In the Claims

Column 14, Claim 8, Line 11:
After "comprising", insert --:--

Signed and Sealed this
Twenty-sixth Day of March, 2024

*Katherine Kelly Vidal*

Katherine Kelly Vidal
*Director of the United States Patent and Trademark Office*